US009678287B2

(12) United States Patent
Rossi et al.

(10) Patent No.: US 9,678,287 B2
(45) Date of Patent: Jun. 13, 2017

(54) OVERBOOT ASSEMBLY HAVING UNLATCHING AND STRAIN RELIEF FEATURES FOR FIBER OPTIC CABLE TERMINUS

(71) Applicant: COTSWORKS, LLC, Highland Heights, OH (US)

(72) Inventors: Nick Rossi, Cleveland, OH (US); Eugen Artemie, Mayfield Heights, OH (US); Ken Applebaum, Cleveland Heights, OH (US)

(73) Assignee: COTSWORKS, LLC, Highland Heights, OH (US)

( * ) Notice: Subject to any disclaimer, the term of this patent is extended or adjusted under 35 U.S.C. 154(b) by 0 days.

(21) Appl. No.: 15/064,580

(22) Filed: Mar. 8, 2016

(65) Prior Publication Data

US 2016/0266329 A1    Sep. 15, 2016

Related U.S. Application Data

(60) Provisional application No. 62/130,230, filed on Mar. 9, 2015.

(51) Int. Cl.
| | | |
|---|---|---|
| *G02B 6/38* | (2006.01) | |
| *G02B 6/42* | (2006.01) | |
| *G02B 6/28* | (2006.01) | |
| *H01S 3/00* | (2006.01) | |
| *B23K 26/06* | (2014.01) | |

(52) U.S. Cl.
CPC .......... *G02B 6/3887* (2013.01); *G02B 6/4292* (2013.01)

(58) Field of Classification Search
CPC ...... G02B 6/36; G02B 6/3807; G02B 6/3869; G02B 6/3887; G02B 6/389; G02B 6/3893; H01R 13/627
USPC ..... 385/100–109, 60–65, 53, 54, 56, 58, 70, 385/76, 77, 78, 81, 139; 439/352, 357
See application file for complete search history.

(56) References Cited

U.S. PATENT DOCUMENTS 4,772,081 A * 9/1988 Borgos ................. G02B 6/3847
                                                            385/88
5,265,182 A    11/1993 Hartley
(Continued)

OTHER PUBLICATIONS

ELIO® Fiber Optic Technology EN4531, ABS1213, ABS1379, ARINC 801, Souriau Product Literature, Esterline Connection Technologies, 2014, 44 Pages.
(Continued)

*Primary Examiner* — Akm Enayet Ullah
(74) *Attorney, Agent, or Firm* — Tucker Ellis LLP

(57) ABSTRACT

To improve the termination of a fiber optic cable, disclosed is an overboot assembly for a fiber optic terminus that retains a terminal end of the fiber optic cable in a receptacle. The overboot assembly provides strain relief to the fiber optic cable. Also, the overboot includes a removal member that is not separable from a fiber optic assembly of the fiber optic cable, the terminus and the overboot. The removal member may be advanced longitudinally relative to the terminus to manipulate a retaining member in the receptacle that latches the terminus in a connected state with the receptacle. Manipulation of the retaining member unlatches the terminus so that the terminus may be removed from the receptacle.

18 Claims, 9 Drawing Sheets

(56) References Cited

U.S. PATENT DOCUMENTS

| | | | | |
|---|---|---|---|---|
| 5,542,015 A * | 7/1996 | Hultermans | ......... | G02B 6/3893 |
| | | | | 385/139 |
| 5,778,122 A * | 7/1998 | Giebel | ................ | G02B 6/3825 |
| | | | | 385/137 |
| 5,940,559 A | 8/1999 | Noll | | |
| 5,960,137 A | 9/1999 | Noll | | |
| 6,600,855 B2 * | 7/2003 | Werkheiser | .......... | G02B 6/3803 |
| | | | | 359/364 |
| 7,244,066 B2 * | 7/2007 | Theuerkorn | ......... | G02B 6/3825 |
| | | | | 385/53 |
| 7,264,402 B2 * | 9/2007 | Theuerkorn | ......... | G02B 6/3821 |
| | | | | 385/53 |
| 7,785,019 B2 * | 8/2010 | Lewallen | ............. | G02B 6/3817 |
| | | | | 385/53 |
| 2007/0232121 A1 | 10/2007 | Trout | | |
| 2008/0175541 A1 * | 7/2008 | Lu | ........................ | G02B 6/3816 |
| | | | | 385/62 |
| 2012/0057830 A1 * | 3/2012 | Taira | .................... | G02B 6/3825 |
| | | | | 385/78 |
| 2013/0322826 A1 * | 12/2013 | Henke | ................. | G02B 6/3834 |
| | | | | 385/60 |

OTHER PUBLICATIONS

International Search Report and Written Opinion from corresponding International Patent Application No. PCT/US2016/021408, mailed May 17, 2016.

* cited by examiner

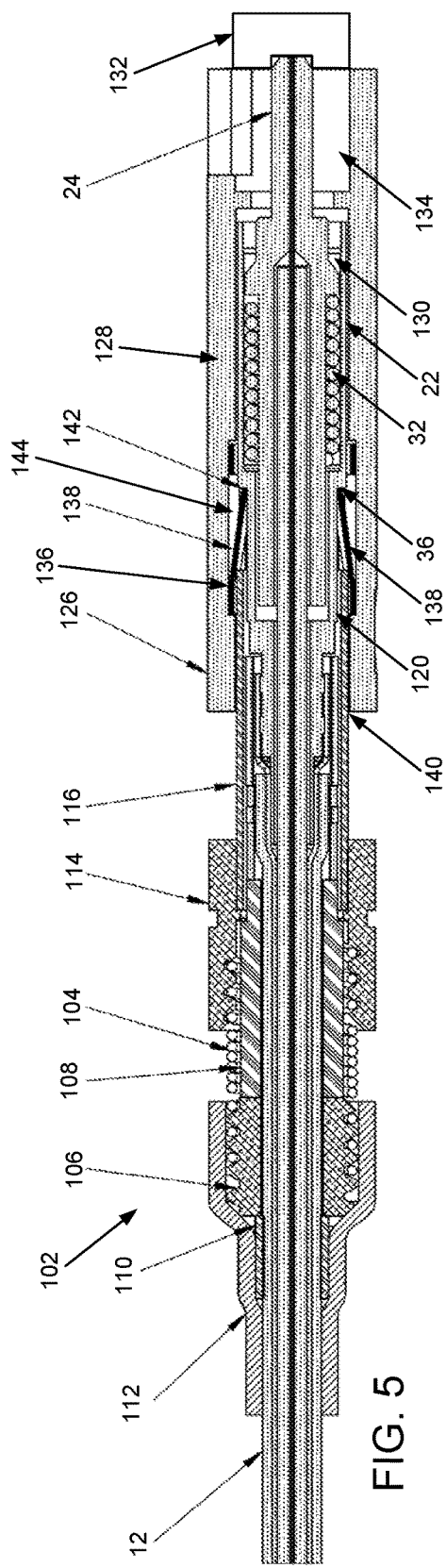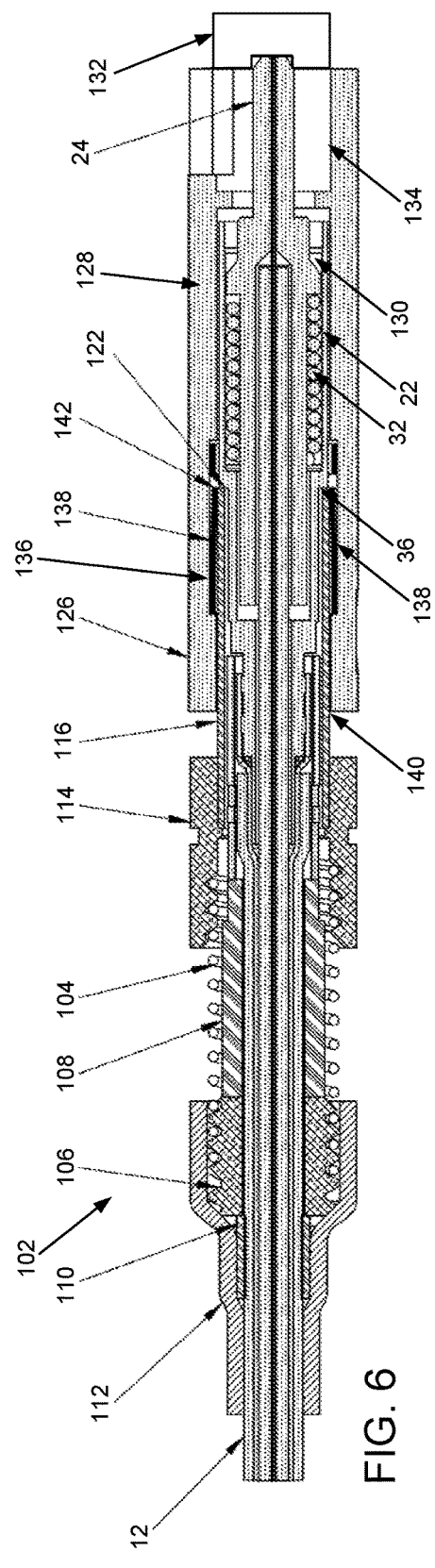

OVERBOOT ASSEMBLY HAVING UNLATCHING AND STRAIN RELIEF FEATURES FOR FIBER OPTIC CABLE TERMINUS

RELATED APPLICATION DATA

This application claims the benefit of U.S. Provisional Patent Application No. 62/130,230 filed Mar. 9, 2015, the disclosure of which is incorporated herein by reference in its entirety.

BACKGROUND

Military, commercial avionics, and industrial networking equipment manufacturers are adopting fiber optic components for communication applications. An exemplary communication application is to create an operative communication link between a control system and a sensor or other data collection device. The use of fiber optic links are often used to replace existing electrical (e.g., "copper") wiring architectures. Fiber optic links provide higher speed, improved electro-magnetic interference (EMI) performance, lower weight, and increased density. Other advantages of fiber optic links include higher data capacity using multiple light propagation modes. In addition, the fiber optic cable itself is protocol agnostic. Therefore, system upgrades often may be made without replacing the fiber optic cable.

Most fiber optic products are designed for the telecommunications market. But these products are generally not rugged enough to withstand the environmental factors that would adversely affect fiber optic systems in harsh operating environments where extreme states of vibration, shock, and temperature may be present.

One common connector (also referred to as terminus) that is used to establish a rugged connection with a mating receptacle is a terminus that is compliant with the ARINC 801 standard in the Size 16 form factor (also referred to herein as an ARINC 801 terminus or, in the plural form, ARINC 801 termini). ARINC 801 termini have been adopted in a variety of military and aerospace applications. ARINC 801 termini, however, lack components to provide cable strain relief directly on the termini and must be supported within the connector into which they are inserted. Also, removal of an ARINC 801 terminus from a mating receptacle requires a separate tool. The tool must be provided by a person servicing the optical system since the tool is not part of the optical system itself. Therefore, the tool is not always readily available or configured to fit within the space in which the terminus and receptacle are located. These shortcomings have limited the adoption and usefulness of ARINC 801 termini.

For reference, FIG. 1 illustrates a longitudinal cross-section of a conventional ARINC 801 terminus 10 connected to the terminal end of a fiber optic cable 12. The assembly of the fiber optic cable 12 and the ARINC 801 terminus 10 may be referred to as an ARINC 801 terminated fiber cable.

The fiber optic cable 12 includes a fiber optic filament 14 that is surrounded by one or more coating layers 16. The fiber optic filament 14 typically includes a core and a cladding. In the illustrated embodiment, the coating layers 16 are surrounded by strength members 18, such as KEVLAR fibers. One or more jacketing layers, also referred to as a jacket 20 surround the strength members 18.

The terminus 10 includes a tubular body 22, a ferrule 24 and a crimp sleeve 26. The jacket 20 and strength members 18 are captured between the crimp sleeve 26 and a land portion 28 at a rearward end of the body 22. The terms rearward and forward, as used herein, respectively refer to directions along the longitudinal axis of the fiber optic cable 12 away from an optical component with which an end 30 of the fiber optic filament 14 interfaces and toward the optical component.

The coating layers 16 are partially stripped from the fiber optic filament 14 and the ferrule 24 is secured to the filament 14 and/or coating layers 16, as is typical for fiber optic connectors. The ferrule 24 and forward end 30 of the filament 14 are urged in a forward direction relative to the body 22 under the force of a spring 32. An internal shoulder 34 in the body 22 provides a surface against which the rearward end of the spring 32 acts.

Compression of the crimp sleeve 26 against the jacket 20, strength members 18 and rearward portion of the body 22 limit longitudinal movement of the body 22 relative to the fiber optic cable 12.

In an exemplary use application, the terminus 10 is inserted into and retained by a receptacle 38 to establish an operative optical coupling between the filament 14 and an optical component (not shown in FIG. 1) that is located in the receptacle. Retaining of the terminus 10 may be accomplished by engagement of ends of deflectable fingers 40 against an external shoulder 36 of the body 22. Release of the terminus 10 from the receptacle is accomplished by placing a "C" shaped sleeve of a removal tool (not shown) around the fiber optic cable 12 and advancing the sleeve in a forward direction under the ends of the deflectable fingers 40 to move the fingers outward in a radial direction a sufficient distance so that the fingers no longer trap the body 22 in the receptacle. As indicated, however, such a tool is not always readily available or configured to fit within the space in which the terminus and receptacle are located. Moreover, such a tool is difficult to use in a proper manner to avoid damage to the fiber optic cable or terminus.

In a typical arrangement, the terminus 10 and the receptacle 38 are keyed. As such, proper insertion of the terminus 10 into the receptacle includes angular alignment of the respective keying features. A keying feature of the terminus 10 may include a radial projection and the keying feature of the receptacle 38 may be a coordinating slot in a housing 42 of the receptacle 38 that forms a longitudinal passage 44 for receiving the terminus 10.

SUMMARY

To improve the serviceability of a locking terminus for a fiber optic cable, such as an ARINC 801 terminus, disclosed is a terminus overboot assembly. The overboot assembly is made up of components that become integrated with the fiber optic cable and terminus. The components of the overboot assembly are arranged to carry out several functions, including facilitating insertion and removal of the terminus into and out of a coordinating receptacle and to provide strain relief to the fiber optic cable, particularly at the rearward end of the terminus and its crimp location. The overboot assembly is not separable from a fiber optic assembly formed from the fiber optic cable, the terminus and the overboot assembly itself. Thus, with respect to the terminus removal function of the overboot assembly, the overboot assembly may be considered a removal tool. To accomplish the removal function, the overboot assembly includes a removal member that may be advanced longitudinally relative to the terminus to manipulate a retaining member in the receptacle that captures (e.g., latches) the terminus in a connected state with the receptacle. Manipulation of the retaining member unlatches the terminus so that the terminus may be removed from the receptacle.

BRIEF DESCRIPTION OF THE DRAWINGS

FIG. 5 is a cross-section of the fiber optic assembly in an installed state with a receptacle, taken along a longitudinal axis thereof.

FIG. 6 is a cross-section of the fiber optic assembly where a removal member of the overboot assembly is in an engaged state to unlatch the terminus from the receptacle, taken along a longitudinal axis thereof.

The figures are not necessarily to scale.

DETAILED DESCRIPTION

Some persons of ordinary skill in the art use the term "connector" for the terminal end connecting assembly of a fiber optic cable and other persons of ordinary skill in the art use the term "terminus" for the same or similar connecting assembly. This largely depends on the application. For example, persons of ordinary skill in the art in telecommunications typically use the term connector and persons of ordinary skill in the art in the military and avionics fields typically use the term terminus. For purposes of this document, the term connector and terminus have the same meaning.

Figure 1:
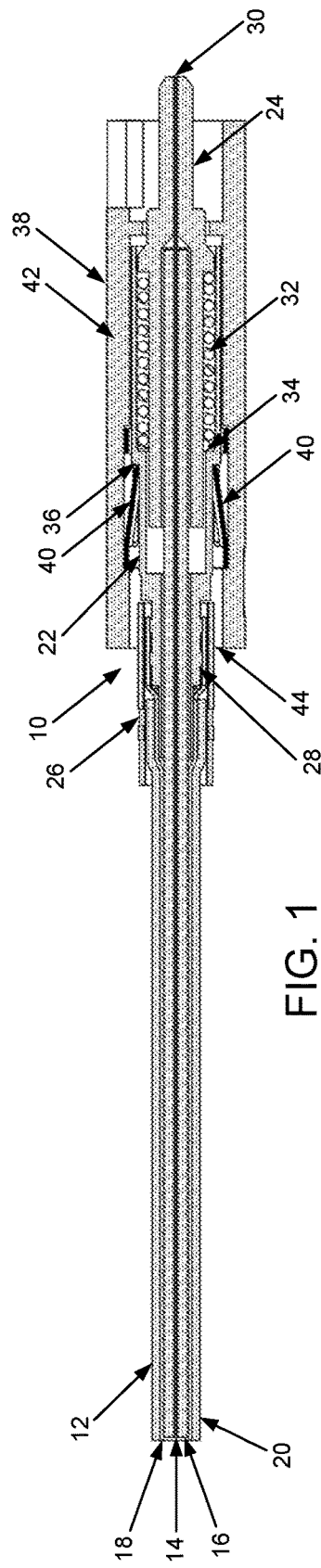
FIG. 1 is cross-section of a conventional fiber optic cable and terminus therefore.
Figure 2:
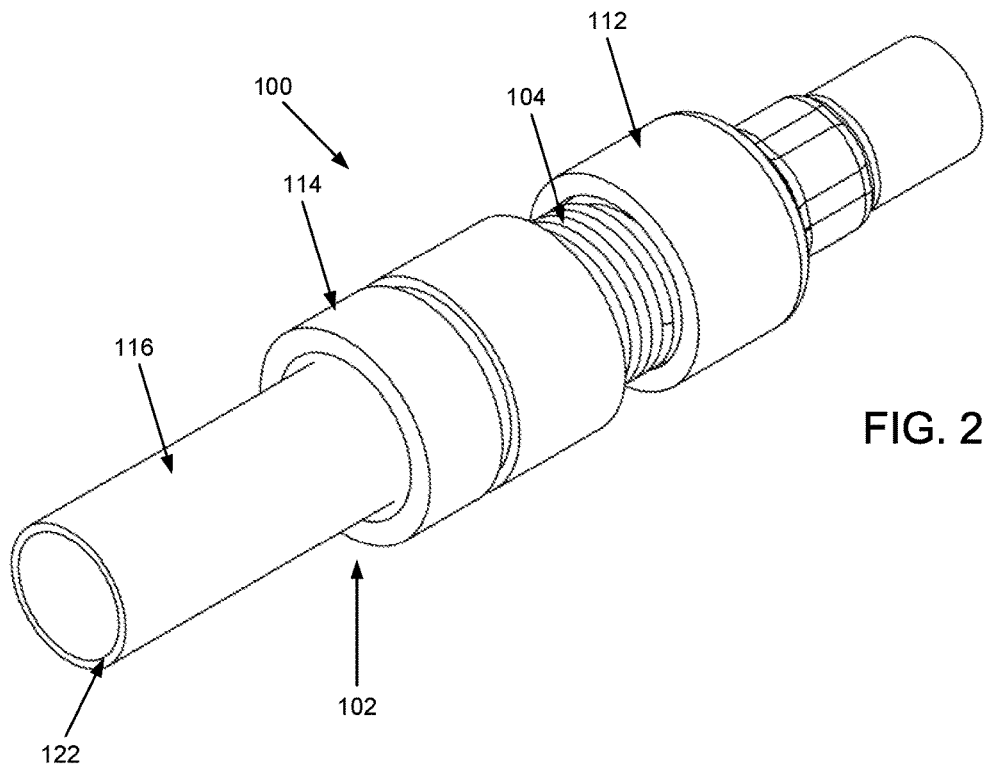
FIG. 2 is a rearward facing perspective view of an overboot assembly for a fiber optic cable terminus.
Figure 3:
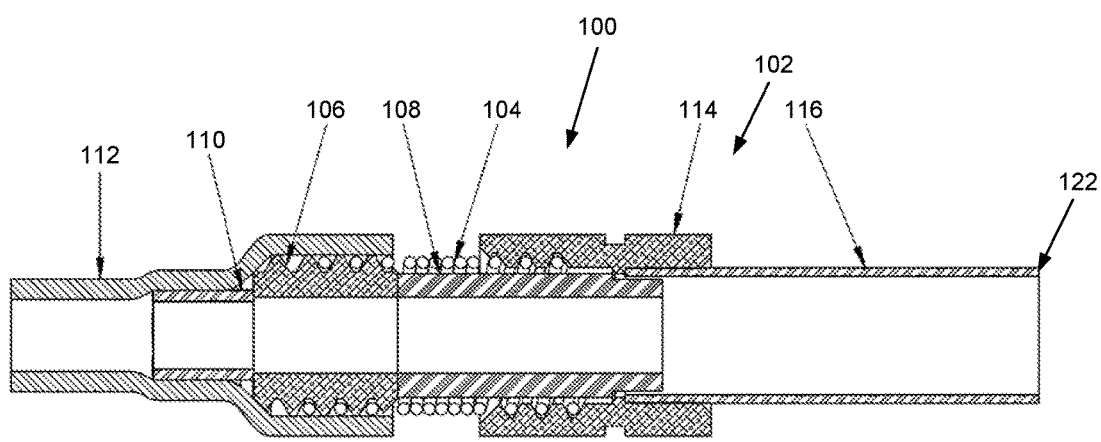
FIG. 3 is a cross-section of the overboot assembly of FIG. 2 taken along a longitudinal axis thereof
Figure 4:
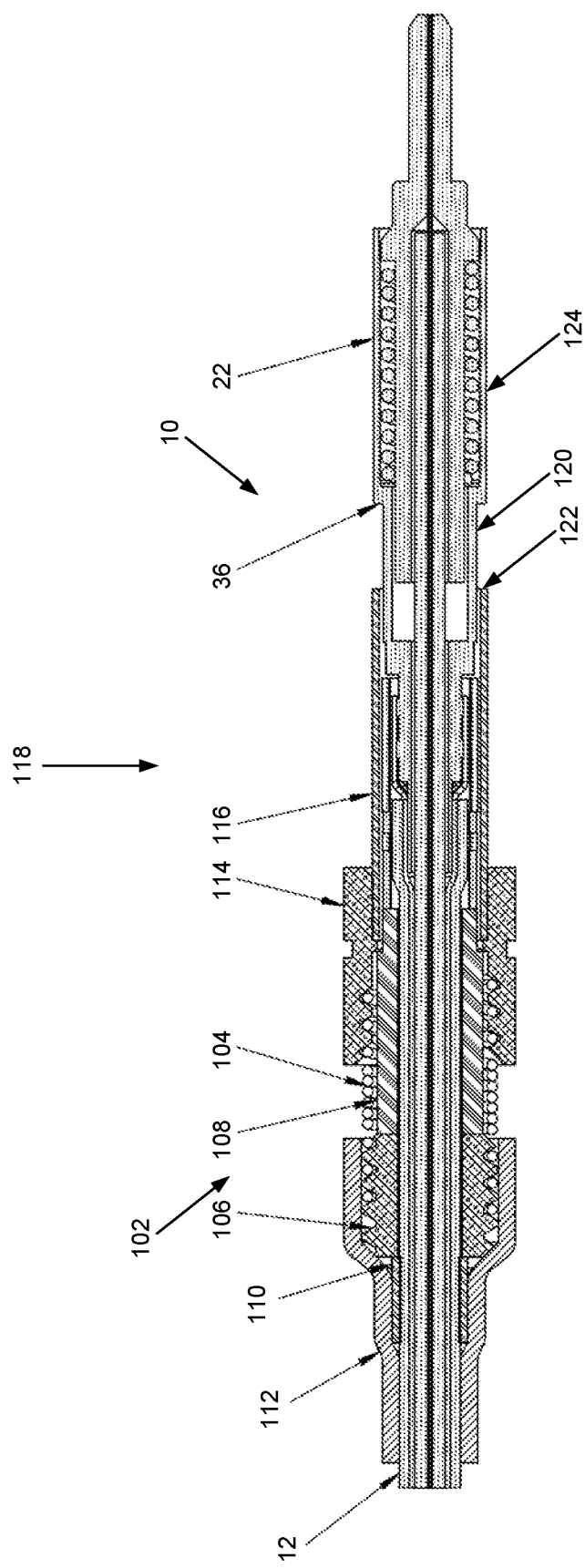
FIG. 4 is a cross-section of a fiber optic assembly including a fiber optic cable and terminus together with the overboot assembly, taken along a longitudinal axis thereof.

Referring to FIGS. 2, 3 and 4, a representative embodiment of an overboot assembly 100 for a terminus 10 (FIG. 4) for a fiber optic cable 12 is illustrated. In the illustrated embodiment, the fiber optic cable 12 and terminus 10 are as described in connection with FIG. 1. Therefore, in the illustrated embodiment, the terminus 10 is a terminus compliant with the ARINC 801 standard in the Size 16 form factor and the reference numerals used in connection with FIG. 1 are used throughout. In this regard, features that are described and/or illustrated with respect to one embodiment may be used in the same way or in a similar way in one or more other embodiments and/or in combination with or instead of the features of the other embodiments. The illustrated terminus 10 retains one fiber optic cable 12 and, therefore, one fiber optic filament 14. In other embodiment, the terminus 10 may retain more than one fiber optic cable 12 and/or more than one fiber optic filament 14.

The overboot assembly is a combined strain relief and insertion/removal tool for a terminated fiber optic cable. In the illustrated embodiment, the overboot assembly 100 includes a removal member 102, a spring 104, a spring anchor 106, a cable standoff 108, a cable retention member (CRM) 110 and a cover 112. In other embodiments, the overboot assembly 100 may include fewer components, additional components, or different components that serve the same or similar functional purposes. For example, the CRM 110 and the spring anchor 106 may be combined.

The CRM 110 is secured to the jacket 20 of the fiber optic cable 12 by mechanical interference so that the CRM 110 is longitudinally fixed in location relative to the fiber optic cable 12. Alternatively, the CRM 110 may be secured to the fiber optic cable 12 using adhesive or another securing means. In one embodiment, the CRM 110 is located relative to the crimp sleeve 26 of the terminus 10 to longitudinally trap the spring anchor 106 and the cable standoff 108 between the crimp sleeve 26 and CRM 110. Also, if the rearward end of the crimp sleeve 26 and the forward end of the CRM 110 are spaced apart by the sum of the lengths of the anchor 106 and the standoff 108, then the locations of the anchor 106 and the standoff 108 will be fixed relative to the fiber optic cable 12 since the crimp sleeve 26 and the CRM 110 will limit longitudinal travel of the anchor 106 and the standoff 108.

A static end of the spring 104 is held by the spring anchor 106. In the illustrated embodiment, the exterior surface of the spring anchor 106 is threaded and the spring 104 is threaded onto the threads of the spring anchor 106. The cover 112 may be configured to cover the spring 104, the spring anchor 106, the CRM 110, and a portion of the fiber optic cable 12 rearward of the CRM 110. The standoff 108 radially separates the fiber optic cable 12 and the spring 104 to allow for relatively smooth extension and retraction of the spring 104 during use of the removal member 102, as will be described below. In one embodiment, the standoff 108 is made from low friction material.

The removal member 102 may be tubular in nature and may include a grip 114 and a sleeve 116. In one embodiment, the grip 114 and sleeve 116 are two components that are joined together by an interference fit, swaging, adhesive, or some other fastening technique. In other embodiments, the grip 114 and sleeve 116 are respective portions of a monolithic element. In either case, longitudinal movement of the grip 114 under manipulation of a user's fingers or a tool results in coordinated longitudinal movement of the sleeve 116. The grip 114 is connected to the dynamic end of the spring 104. In the illustrated embodiment, the interior surface of the grip 114 is threaded and the spring 104 is threaded onto the threads of the grip 114. Thread locking adhesive or other fastening technique may be used to prevent separation of the spring 104 from the spring anchor 106 and/or the removal member 102 in the event that the removal member 102 is rotated relative to the spring 104 or the spring 104 is rotated relative to the spring anchor 106.

The spring 104 is configured to have a normally compressed state to bias the removal member 102 in the rearward direction. The return force of the spring 104 may be overcome by urging the removal member 102 in a forward direction. However, the return force of the spring 104, in conjunction with damping forces due to friction between spring 104 and cover 112, and between standoff 108 and grip 114, is preferably greater than longitudinally forward force that may be placed on the removal member 102 in ordinary operating conditions of the optical system in which the terminus 10 employed. Therefore, it is contemplated that forces such mechanical stress, vibration, shock, etc. will not significantly advance the removal member 102 in the forward direction relative to the fiber optic cable 12 by an amount to unlatch the terminus 10 from a coordinating receptacle.

When combined together, the fiber optic cable 12, the terminus 10 and the overboot assembly 100 may be referred to as a fiber optic assembly 118. An exemplary method of assembling the fiber optic assembly 118 will be described. In one embodiment, the anchor 106, the spring 104 and the removal member 102 are preassembled by attaching the spring to the anchor 106 and the removal member 102. Assembly of the overboot assembly 100 with the fiber optic cable 12 may include sliding the cover 112, the CRM 110, the preassembled anchor 106, spring 104 and removal member 102, and the standoff 108 onto the fiber optic cable 12 in the listed order. Next, the terminus 10 is attached to the forward end of the fiber optic cable 12 in the conventional manner. Then, the standoff 108, the anchor 106, spring 104 and removal member 102, and the CRM 110 are advanced in the forward direction to be positioned as desired relative to the terminus 10. In one embodiment, the desired position includes a forward end of the standoff 108 contacting the rearward end of the crimp sleeve 26, the forward end of the anchor 106 contacting the rearward end of the standoff 108 and the forward end of the CRM 110 contacting the rearward end of the anchor 106. In this configuration, the sleeve 116 surrounds the crimp sleeve 26 and a rearward portion 120 of the body 22 that is located rearward of the shoulder 36. When the components are positioned, the CRM 110 may be compressed or otherwise secured to the fiber optic cable 12 to maintain the relative positioning of the components. The cover 112 may then be advanced in the forward direction to cover a portion of the fiber optic cable 12, the spring 104, the CRM 110 and the anchor 106. In one embodiment, the cover 112 may be shaped to maintain its position covering a portion of the fiber optic cable 12, the CRM 110 and the anchor 106. Alternatively, the cover 112 may be secured in place with adhesive, features that interlock with features of the CRM 110 or anchor 106, heat shrinking, or other securing technique.

In one embodiment, the sleeve 116 has a cross-sectional geometry that coordinates with the cross-sectional geometry of the rearward portion 120 of the body 22 to allow the removal member 102 to longitudinally move relative to the body 22. In the illustrated embodiment, these geometries are circular. The movement of the removal member 102 may include forward movement between the retracted position shown in FIG. 4 and an advanced position (e.g., FIG. 6). The advanced position is a position where a forward end 122 of the sleeve 116 is moved toward the shoulder 36 a sufficient amount to unlatch the terminus 10 from a coordinating receptacle as will be described in greater detail below. In one embodiment, the advanced position includes a position where the forward end 122 contacts the shoulder 36.

In one embodiment, the sleeve 116 completely surrounds the fiber optic cable 12 and a rearward portion 120 of the terminus 10. For example, the sleeve 116 may be circular and forms a tube or hollow cylinder that is open at both ends. In another embodiment, the sleeve 116 partially surrounds the fiber optic cable 12 and the rearward portion 120 of the terminus 10, but is not separable from the terminated fiber optic cable 12. For example, the sleeve 116 may be "C" shaped in cross-section. In one embodiment, an outside diameter of the sleeve 116 is the same as or similar to an outside diameter of a forward portion 124 of the body 22 that is located forward of the shoulder 36. Thus, the wall thickness of the sleeve 116 is approximately the radial height of the shoulder 36.

The overboot assembly 100 may provide strain relief to the fiber optic cable 12. In one embodiment, the removal member 102, the anchor 106 and the CRM 110 are rigid bodies and the spring 104, standoff 108 and cover 112 are flexible bodies. The components of the overboot assembly 100 combine to contribute to strain relief. More specifically, the components are independent from one another and allow for small deflections relative to one another while increasing the rigidity of the underlying fiber optic assembly 118 as a whole. Thus, the combination of the components of the overboot assembly 100 allow for controlled and limited bending of the fiber optic cable 12.

With additional reference to FIG. 5, interaction of the fiber optic assembly 118 with a coordinating receptacle 126 will be described. In the illustrated example, the receptacle is a receptacle that is configured to operatively coordinate with a Size 16 ARINC 801 compliant terminus. In other embodiments, the terminus 10 and the receptacle 126 may be compliant with other standards or may not fall under any standards for fiber optic connectors. The terminus 10 is sized and shaped to coordinate with and fit into the geometry of the receptacle 126. Hence, the terminus 10 may be considered a male component of a fiber optic interface and the receptacle 126 may be considered a female component of the separable interface.

FIG. 5 illustrates the fiber optic assembly 118 in an installed state (also referred to as a connected state) with the receptacle 126. In exemplary embodiments, the receptacle 126 may be a bulkhead or panel mounted receptacle, or a receptacle that is mounted to a circuit board. The receptacle 126 includes a housing 128 that forms a longitudinal passage 130 for receiving the terminus 10. The receptacle 126 houses an optical component 132 that optically interfaces with the fiber optic filament 14 of the fiber optic cable 12. The optical component 132 may be passive or may be active (e.g., an optical receiver, an optical transmitter, an optical transceiver, or another optical terminus). The ferrule 24 may be received in a ferrule 134 of the optical component 132. Interaction of the ferrule 134 and/or the optical component 132 with the ferrule 24 may compress the spring 32 so as to increase the forward force placed on the filament 14 to facilitate optical coupling of the filament 14 and optical component 132.

The body 22 of the terminus 10 is retained in the receptacle 126 in a manner to minimize longitudinal movement of the terminus 10 relative to the receptacle 126 in at least the rearward direction. Radial movement of the terminus relative to the receptacle 126 also may be restricted by interaction of the terminus 10 and the receptacle 126. In one embodiment, the terminus 10 and receptacle 126 have respective key features that limit rotation of the terminus 10 relative to the receptacle 126.

In the illustrated embodiment, and as is conventional for receptacles for ARINC 801 termini, a spring clip 136 is secured in the longitudinal passage 130 in a position to surround the body 22 of the terminus 10. The spring clip 136 includes one or more inwardly-biased, deflectable fingers 138. The fingers 138 may be resilient in nature so that they return to a natural position relative to the receptacle 126 when not moved by another object, such as the body 22 or the sleeve 116.

In the illustrated embodiment, there are two opposing fingers 138. Each finger 138 is configured to be urged radially outward by the terminus body 22 when the terminus 10 is inserted into the longitudinal passage 130 through an open end 140 opposite the optical component 132. This allows passage of the forward portion 124 of the body 22 until the shoulder 36 passes forward ends 142 of the fingers 138. At the point where the shoulder 36 passes the forward ends 142 of the fingers 138, the fingers 138 move radially inward so that the ends 142 engage the shoulder 36, thereby trapping the body 22 in the longitudinal passage 130 and preventing removal of the terminus 10 from the receptacle 126. The shoulder 36 serves as a stop to prevent the fiber optic terminus 10 from being removed from the receptacle 126. The spring clip 136 may be a c-shaped clip that snaps into a slot 144 in an inner wall of the housing 128 that defines the passage 130 to secure the spring clip in the passage 130. Each finger 138 may be considered a latching or retaining member that latches or locks the terminus 10 in the receptacle 126. Other retaining member configurations are possible that may be released from the terminus 10 by the removal member 102.

In the installed configuration of the terminus 10, the removal member 102 is located in its retracted position and maintained in this position by the spring 104 and damping forces due to friction between spring 104 and cover 112, and between standoff 108 and grip 114. A portion of the sleeve 116 may be present in the longitudinal passage 130 and interposed between the housing 128 and the rearward portion 120 of the body. In this position, however, the sleeve 116 does not interfere with operation of the spring clip 136 to retain the terminus 10 in the receptacle 126. In the retracted position, the forward end 122 of the sleeve is located rearward of the fingers 138 to not influence the position of the forward ends 142 of the fingers 138 relative to the shoulder 36.

Figure 7:
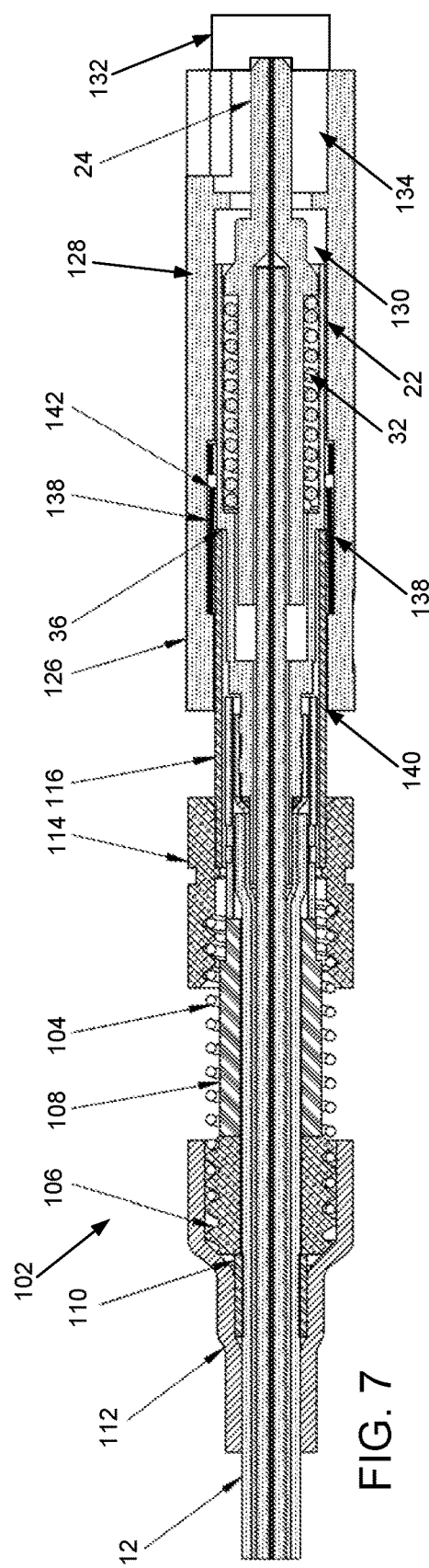
FIG. 7 is a cross-section of the fiber optic assembly in a partially removed state relative from the receptacle, taken along a longitudinal axis thereof.
Figure 8:
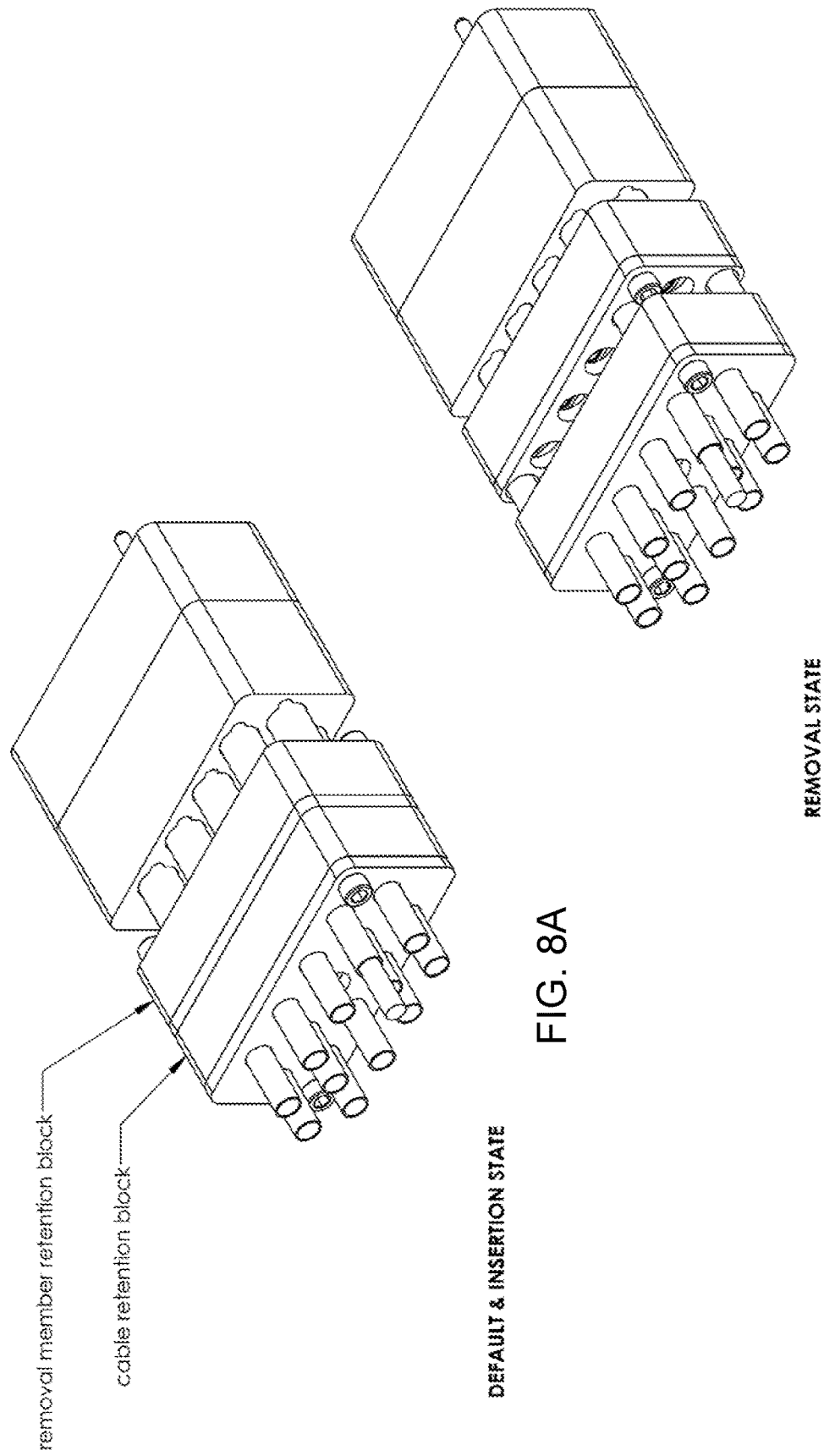
FIG. 8A shows a connector assembly for multiple termini where the termini are in an installed state relative to a receptacle.
FIG. 8B shows the connector assembly of FIG. 8A where a removal member retention block of the connector assembly is in a state to unlatch the termini from the receptacle.
Figure 9:
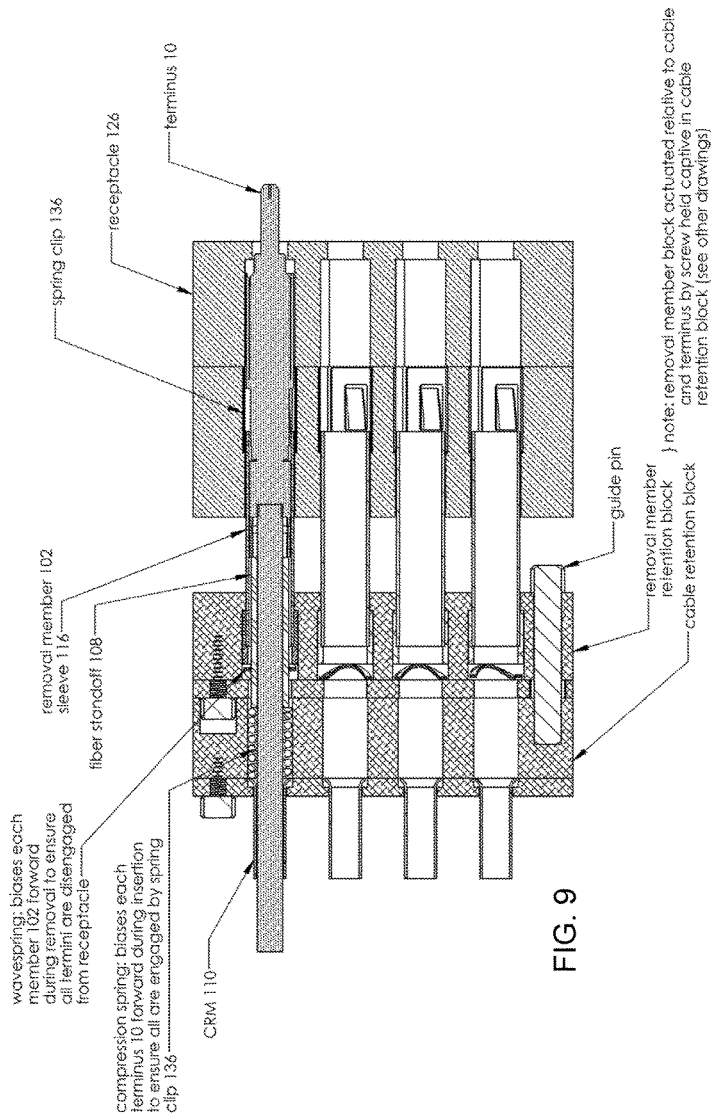
FIG. 9 is a first cross-section of the connector assembly and receptacle of FIG. 8A.
Figure 10:
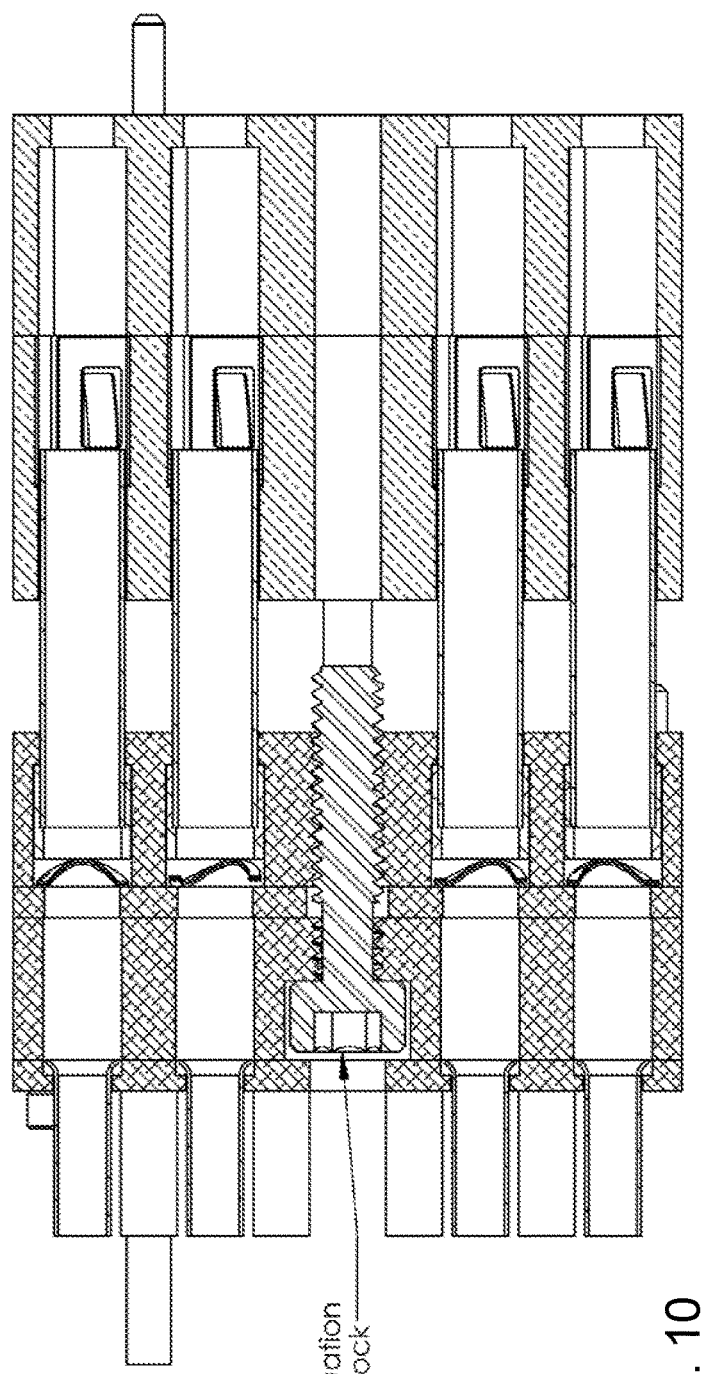
FIG. 10 is a second cross-section of the connector assembly and receptacle of FIG. 8A.
Figure 11:
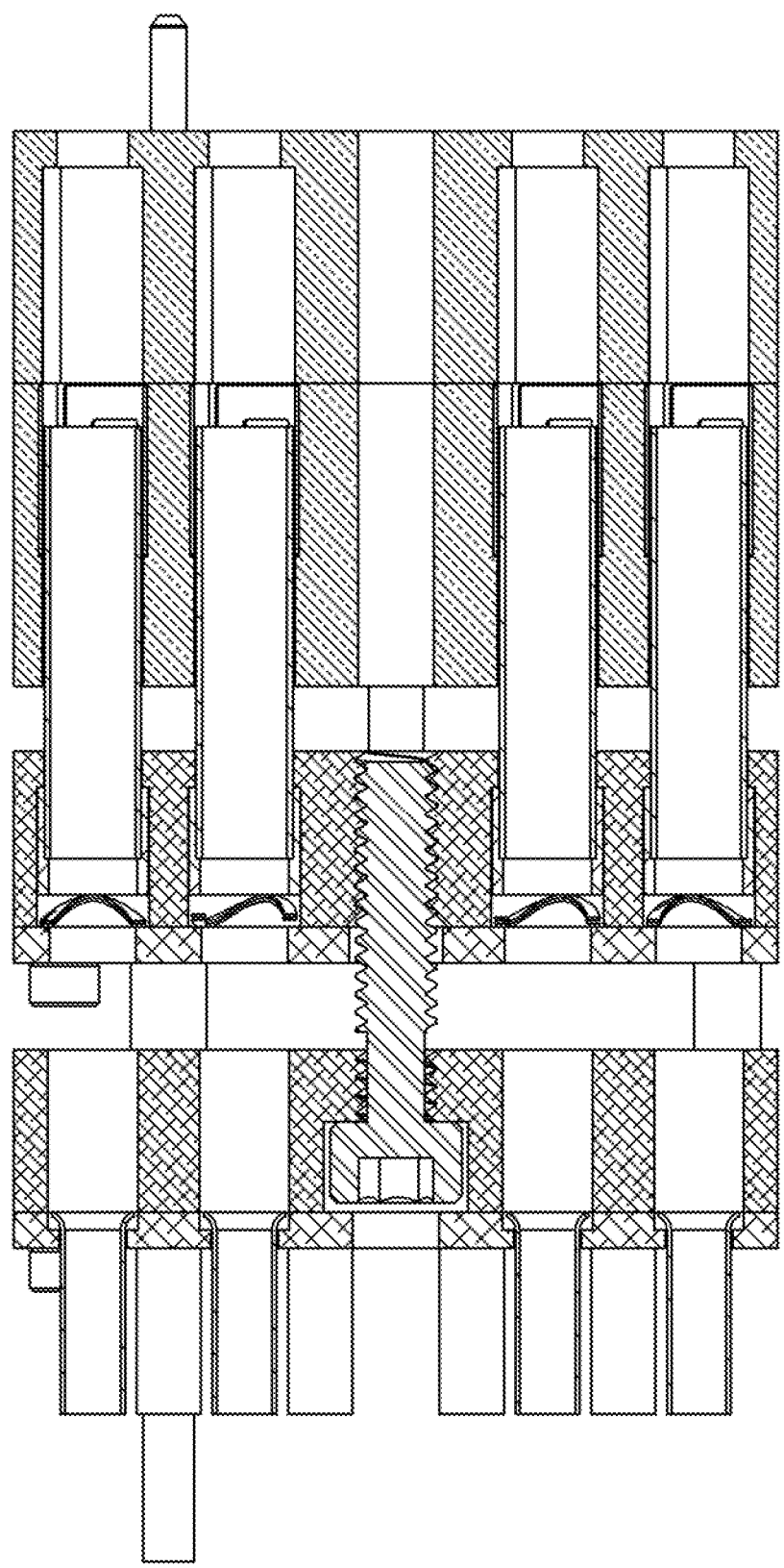
FIG. 11 is a cross-section of the connector assembly and receptacle of FIG. 8B.

With additional reference to FIGS. 6 and 7, removal of the terminus 10 from the receptacle 126 will be described. Removal involves use of the removal member 102 to defeat the locking mechanism of the receptacle. In one embodiment, installation of the terminus 10 does not involve use of the removal member 102 (other than possibly holding the removal member 102 in a rearward location relative to the terminus 10). Rather, during installation, forward force on the termini 10 may be applied by pushing the cover 112. If used in this manner, the overboot assembly 100 provides strain relief to the fiber optic cable 12 during insertion.

The removal process includes advancing the removal member 102 in the forward direction against the bias of the spring 104. The removal member 102 is moved relative to the fiber optic cable 12, terminus 10 and the receptacle 126 a sufficient distance and with sufficient force to defeat the locking mechanism that retains the terminus 10 in the receptacle 126. The removal member 102 is moved forward a sufficient distance to unlatch the fingers 138 from the body 22 of the terminus 10 to allow rearward movement of the terminus 10 relative to the receptacle 126. In the illustrated embodiment, the forward movement of the sleeve 116 advances the forward end 122 of the sleeve 116 between the fingers 138 and the rearward portion 120 of the body 22 of the terminus 10. This radially pushes the fingers 138 against their inward bias to deflect the fingers 138 radially outward so that the ends 142 of the fingers 138 no longer engage the shoulder 36. In one embodiment, the sleeve 116 is advanced so that the forward end 122 contacts or almost contacts the shoulder 36 to displace the fingers 138 and free the fingers 138 from contacting the body 22 as shown in FIG. 6.

The removal process is completed by holding the removal member 102 in the advanced position and rearwardly moving the cable 12, the terminus 10 and the overboot assembly 100 relative to the receptacle 126. In one embodiment, friction between the ends 142 of fingers 138 and the sleeve 116 may be sufficient to hold the removal member 102 in place after it is advanced in position. Once the shoulder 36 rearwardly moves past the ends 142 of the fingers 138, the ends 142 may contact the forward portion 124 of the body 22 as shown in FIG. 7. But the fingers 138 will no longer prevent further rearward movement of the terminus 10 relative to the receptacle 126 since there are no stops on the forward portion 124 of the body 22 to engage the fingers 138. Therefore, once the shoulder 36 clears the ends 142 of the fingers 138, the terminus 10 is free to be completely removed from the receptacle 126.

As will be appreciated, the removal member 102 is inherently constrained in its movement. Radial movement is limited by the captive arrangement of the fiber optic cable 12 extending through the removal member 102. Rearward movement is limited by the CRM 110 having a fixed relationship to the fiber optic cable 12 and functioning as a stop for the anchor 106 and removal member 102. Forward movement of the removal member 102 may be made, but is restricted by the mechanical limits of the spring 104 and/or the shoulder 36.

With additional reference to FIGS. 8A-11, shown is an embodiment where multiple termini 10 are retained by a connector assembly that provides strain relief and insertion/removal functions similar to the overboot assembly 100. As indicated, ARINC 801 termini and coordinating receptacles are keyed. As a result, an ARINC 801 terminus may be only be installed into a coordinating receptacle when the terminus is in a proper angular orientation relative to the receptacle, of which there are typically only one or two proper angular orientations. In a single terminus embodiment, such as that shown in connection with FIGS. 2-7, angular orientation for installation is controlled by the person handling the assembly. In the embodiment of FIGS. 8A-11, angular orientation for each of multiple termini is controlled by a cable retention block that retains each terminus in coordination with the receptacle. In this embodiment, the receptacle includes a keyed receiving passage for each terminus. Each passage has a capture mechanism to retain a terminus inserted therein. Exemplary capture mechanisms include the finger-based latching members as described above.

Although the termini are each held by the cable retention block, each are treated individually to facilitate insertion and engagement of the termini in the respective passages of the receptacle and to facilitate unlatching and removal of the termini from the respective passages of the receptacle. In the illustrated embodiment, each termini is treated individually using spring forces. For example, a removal member retention block that is interposed between the cable retention block and the receptacle may include a wave spring to forwardly bias the respective removal member 102 during removal (see FIGS. 9-11). Compression springs in the cable retention block forwardly bias the respective terminus (see FIGS. 9-11) during insertion.

The increased shock, vibration and coordination considerations involved in joining multiple termini with a coordinating receptacle introduces commensurate increases in size and weight of the connector components. As a result, it would be difficult for an operator to unlatch and remove all the termini with a simple linear "push" (e.g., forward advancement of the removal member retention block relative to the cable retention block and receptacle) that both overcomes the involved spring forces and alignment considerations. Therefore, in the illustrated embodiment, a screw that is fixed relative to the cable retention block is turned to advance and retreat the removal member retention block. The removal member retention block retains a removal member for each terminus and, when advanced, engages a respective terminus retaining member located in the receptacle and unlatches the terminus retaining members from the respective termini.

Additional aspects of the disclosure will be understood from the appended claims, which form part of this specification.

The invention claimed is:

1. An overboot assembly for a fiber optic assembly that includes a terminus secured to a fiber optic cable at a terminal end thereof, the terminus configured to mate with a coordinating fiber optic receptacle, when mated with the fiber optic receptacle the terminus retained in the fiber optic receptacle by a terminus retaining member that is located in the fiber optic receptacle and that latches against the terminus, the overboot assembly comprising:
an anchor having a longitudinally fixed position relative to the fiber optic cable and the terminus, the fixed position rearward of the terminus;
a removal member through which the fiber optic cable passes making the removal member unreleasable from the fiber optic assembly, the removal member advanceable in a forward direction relative to the anchor, the fiber optic cable and the terminus to engage the terminus retaining member located in the receptacle and unlatch the terminus retaining member from the terminus to release and remove the terminus from the receptacle; and
a spring having a rearward end fixed at and acting against the anchor and a forward end acting on the removal member, the spring biasing the removal member in a rearward retracted position in which a forward end of the removal member is longitudinally spaced in the rearward direction from the terminus retaining member to avoid inadvertent unlatching of the terminus from the receptacle.

2. The overboot assembly of claim 1, further comprising a cable retaining member secured to the fiber optic cable and wherein the fixed position of the anchor is achieved by longitudinally trapping the anchor between the cable retaining member and the terminus.

3. The overboot assembly of claim 2, further comprising a standoff, the standoff longitudinally interposed between the anchor and the terminus.

4. The overboot assembly of claim 1, wherein the overboot assembly structurally supports the terminal end of the fiber optic cable at a juncture thereof with the terminus, the support providing strain relief to the fiber optic assembly.

5. The overboot assembly of claim 1, wherein a rearward end of the spring is secured to the anchor and a forward end of the spring is coupled to the removal member.

6. A fiber optic assembly, comprising:
a terminus secured to a fiber optic cable at a terminal end of the fiber optic cable, the terminus configured to mate with a coordinating fiber optic receptacle, the terminus, when mated with the fiber optic receptacle the terminus retained in the fiber optic receptacle by a terminus retaining member that is located in the fiber optic receptacle and that latches against the terminus comprising:
a ferrule assembly secured to a fiber optic filament of the fiber optic cable;
a body surrounding a rearward portion of the ferrule assembly and a portion of the body rearward of the ferrule assembly is longitudinally fixed in position relative to the fiber optic cable; and
a first spring radially interposed between the rearward portion of the ferrule assembly and the body, the spring acting against the body and the ferrule assembly to urge a forward end of the fiber optic filament in a forward direction relative to the body; and
an overboot assembly, comprising:
an anchor having a longitudinally fixed position relative to the fiber optic cable and the terminus, the fixed position rearward of the terminus;
a removal member through which the fiber optic cable passes making the removal member unreleasable from the fiber optic assembly, the removal member advanceable in a forward direction relative to the anchor, the fiber optic cable and the terminus to engage the terminus retaining member located in the receptacle and unlatch the terminus retaining member from the terminus to release and remove the terminus from the receptacle; and
a second spring having a rearward end fixed at and acting against the anchor and a forward end acting on the removal member, the second spring biasing the removal member in a rearward retracted position in which a forward end of the removal member is longitudinally spaced in the rearward direction from the terminus retaining member to avoid inadvertent unlatching of the terminus from the receptacle.

7. The fiber optic assembly of claim 6, wherein the removal member unlatches the terminus retaining member from an external shoulder of the body.

8. The fiber optic assembly of claim 6, the overboot assembly further comprising a cable retaining member secured to the fiber optic cable and wherein the fixed position of the anchor is achieved by longitudinally trapping the anchor between the cable retaining member and the terminus.

9. The fiber optic assembly of claim 8, the overboot assembly further comprising a standoff, the standoff longitudinally interposed between the anchor and the terminus.

10. The fiber optic assembly of claim 6, wherein the overboot assembly structurally supports the terminal end of the fiber optic cable at a juncture thereof with the terminus, the support providing strain relief to the fiber optic assembly.

11. The overboot assembly of claim 6, wherein a rearward end of the spring is secured to the anchor and a forward end of the spring is coupled to the removal member.

12. A fiber optic connector assembly, comprising:
a cable retention block connected to multiple termini, each terminus holding one or more fiber optic cables at a respective terminal end thereof and each terminus held by the cable retention block to mate with a coordinating passage of a fiber optic receptacle, when mated with the fiber optic receptacle each terminus retained in the fiber optic receptacle by a respective terminus retaining member that is located in the fiber optic receptacle and that latches against the terminus; and
a removal member retention block that retains a removal member for each of the termini, wherein the removal member retention block is longitudinally interposed between the cable retention block and the receptacle, and the removal member retention block advanceable in a forward direction relative to the fiber optic cables and termini so that each removal member engages the respective terminus retaining member located in the receptacle and unlatches the terminus retaining members from the respective termini to release and remove the fiber optic connector from the fiber optic receptacle.

13. The fiber optic connector assembly of claim 12, further comprising a threaded member extending longitudinally through the cable retention block and threadably engaged with the removal member retention block, rotation of the threaded member controlling advancement of the removal member retention block.

14. The fiber optic connector assembly of claim 13, wherein the threaded member is captive with the cable retention block.

15. The fiber optic connector assembly of claim 12, wherein the removal members are forwardly biased relative to the removal member retention block.

16. The fiber optic connector assembly of claim 15, wherein wave springs forwardly bias the removal members.

17. The fiber optic connector assembly of claim 12, wherein the cable retention block has a fixed position relative to the fiber optic cables.

18. The fiber optic connector assembly of claim 17, wherein the cable retention block includes a spring for each terminus and each spring forwardly biases the corresponding terminus.

* * * * *